(12) United States Patent
Lin

(10) Patent No.: US 11,827,054 B2
(45) Date of Patent: Nov. 28, 2023

(54) BICYCLE HUB

(71) Applicant: TIEN HSIN INDUSTRIES CO., LTD., Taichung (TW)

(72) Inventor: Shang-Feng Lin, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 78 days.

(21) Appl. No.: 17/559,624

(22) Filed: Dec. 22, 2021

(65) Prior Publication Data

US 2022/0161596 A1    May 26, 2022

Related U.S. Application Data

(63) Continuation-in-part of application No. 17/101,766, filed on Nov. 23, 2020.

(30) Foreign Application Priority Data

Nov. 2, 2021   (TW) ................................. 110140708

(51) Int. Cl.
  *B60B 27/02*  (2006.01)
  *B60B 27/04*  (2006.01)
  *F16D 41/36*  (2006.01)

(52) U.S. Cl.
  CPC .......... *B60B 27/023* (2013.01); *B60B 27/047* (2013.01); *F16D 41/36* (2013.01)

(58) Field of Classification Search
  CPC ........ F16D 41/185; F16D 41/22; F16D 41/32; F16D 41/36; B60B 27/023; B60B 27/047
  See application file for complete search history.

(56) References Cited

U.S. PATENT DOCUMENTS

| | | | | |
|---|---|---|---|---|
| 5,964,332 A | * | 10/1999 | King | B62M 9/10 192/64 |
| 6,123,179 A | * | 9/2000 | Chen | B60B 27/023 192/64 |
| 9,707,801 B2 | * | 7/2017 | Fujita | F16D 1/10 |

\* cited by examiner

*Primary Examiner* — Richard M Lorence
(74) *Attorney, Agent, or Firm* — Apex Juris, pllc; Hilde Coeckx

(57) ABSTRACT

A bicycle hub includes an axle, a main body, a freehub body, and a clutch, which are engaged with the axle. The freehub body is disposed with first splines, wherein each of the first splines is defined to have a longitudinal direction. Each of the longitudinal directions obliquely intersects with an axial direction of the freehub body. The clutch is disposed with second splines, wherein the second splines are engaged with the first splines in a way that the second splines are movable along a longitudinal direction of the first splines. With such design, the clutch of the bicycle hub could be smoothly operated.

7 Claims, 15 Drawing Sheets

BICYCLE HUB

BACKGROUND OF THE INVENTION

Technical Field

The present disclosure relates generally to transmission of a bicycle, and more particularly to a bicycle hub, wherein a clutch in the bicycle hub utilizes a movement in an axial direction to make the bicycle transmission engage in a single direction.

Description of Related Art

A bicycle has a rear derailleur unit, wherein a bicycle hub of a rear wheel of the bicycle has a freehub body disposed with a cassette, a set of multiple sprockets of various sizes. The cassette is adapted to be engaged with a chain of the bicycle around one of the multiple sprockets. By the rear derailleur unit, the chain could be derailed from one sprocket to another, thereby changing gear ratios.

This kind of bicycle hub further comprises a clutch adapted to be a driving connection interface in the bicycle hub between the freehub body and a main body which is connected to a plurality of spokes, so that when the cassette is driven by a forward driving force, the main body is driven to rotate, and when the cassette is exerted by a backward driving force, a driving connection between the freehub body and the main body is disconnected. There are various kinds of clutches with the aforementioned function on the market. Some of the clutches utilizes a movable ratchet and internal gear ring which is disposed along a radial direction of an axle of the bicycle hub to achieve the function of clutch; others of the clutches utilize two ratchets, wherein one of the two ratchets could reciprocatingly move in an axial direction of the axle of the bicycle hub to achieve the function of clutch As the development of bicycle manufacturing techniques and the change of usage of bicycle, reducing a weight of the bicycle has become a market demand and a goal pursued by bicycle manufacturer. However, the clutch of the bicycle hub is usually disposed with splines which are parallel to the axial direction of the bicycle hub. Therefore, the splines merely allows the clutch to move along the axial direction, but does not provide additional force to the clutch for engaging or disengaging. Besides, since the parallel splines is perpendicular to the clutch, the splines provide normal force to the clutch during rotation leading to friction between the splines and the clutch. Thus, the clutch is not easy to be disengaged from or engaged with the parallel splines.

Additionally, take the bicycle hub with a clutch with two ratchets as an example, to reduce a number of ratchet teeth of one of the two ratchets could reduce the weight of the bicycle hub. Therefore, it is important to find out an optimal number of ratchet teeth of each the ratchets that could not only reduce the weight of the bicycle hub, but also provide a good engagement.

BRIEF SUMMARY OF THE INVENTION

In view of the above, the primary objective of the present disclosure is to provide a bicycle hub with a stable function of transmission and to reducing a total weight of the bicycle hub.

The present disclosure provides a bicycle hub includes an axle, a main body, a freehub body, and a clutch, wherein the axle is adapted to be an axis of rotation of the bicycle hub. The main body is rotatably engaged with the axle. The freehub body is rotatably engaged with the axle and is adapted to be engaged with a rear sprocket. The freehub body is disposed with a plurality of first splines. Each of the plurality of first splines is defined to have a longitudinal direction. The longitudinal direction of each of the plurality of first splines obliquely intersects with an axial direction of the axle. The clutch includes a first ratchet and a second ratchet, wherein either the first ratchet or the second ratchet is disposed with a plurality of second splines, wherein the plurality of second splines is engaged with the plurality of first splines in a way that each of the plurality of second splines is slidable along the longitudinal direction of one of the plurality of first splines. One of the first ratchet and the second ratchet is engaged with the main body in a way that is able to drive the main body to rotate, and the other one of the first ratchet and the second ratchet is engaged with the freehub body in a way that is able to drive the freehub body to rotate. The other one of the first ratchet and the second ratchet is driven to move by engaging and disengaging between the plurality of first ratchet teeth and the plurality of second ratchet teeth, and the first ratchet or the second ratchet is movable along the axial direction of the axle between a first position and a second position, wherein the first position is a position that the first ratchet is engaged with the second ratchet, and the second position is a position that the first ratchet is disengaged from the second ratchet.

The longitudinal direction of each of the plurality of first splines obliquely intersects with the axial direction of the freehub body to form a helical angle between the longitudinal direction and the axial direction; the second ratchet has a plurality of second ratchet teeth. Each of the plurality of second ratchet teeth has a tooth bottom and a tooth top, wherein each of the plurality of second ratchet teeth tilts from the tooth bottom to the tooth top to form an inclined plane. An imaginary plane is defined to be perpendicular to the axis of rotation and passes through the plurality of second ratchet teeth of the second ratchet. The inclined plane of each of the plurality of second ratchet teeth intersects the imaginary plane to form a slip angle therebetween. The helical angle is greater than the slip angle.

The helical angle divided by the slip angle is greater than 1.1 and is smaller than 2.

The helical angle is arranged between 15 and 40 degrees, and the slip angle is arranged between 15 and 20 degrees.

The first ratchet has a first engaging surface, wherein the first engaging surface of the first ratchet has a plurality of first ratchet teeth which is arranged along the first engaging surface. The second engaging surface of the second ratchet corresponds to the first engaging surface, wherein the plurality of second ratchet teeth is arranged along the second engaging surface. The number of second ratchet teeth is smaller than the number of first ratchet teeth, and a maximum number of first ratchet teeth is 180. The second ratchet is disposed with the plurality of second splines.

A distance between adjacent two of the second ratchet teeth of the second ratchet is not shorter than a distance between adjacent two of the plurality of first ratchet teeth of the first ratchet.

The second ratchet is movable along an axial direction of the axle between a first position and a second position. The clutch comprises a restoring member, wherein the restoring member is connected to the second ratchet for exerting a restoring force to the second ratchet to keep the second ratchet at the first position.

The restoring member is a spring, elastomer, or a magnet.

The longitudinal direction of each of the plurality of first splines is parallel to an axial direction of the axle.

With the aforementioned design, when the user pedals the bicycle to rotate the bicycle hub, the first splines of the freehub body could provide a normal force to the second splines of the clutch, thereby enhancing the engagement between the freehub body and the clutch. When the user stop pedaling to slide, a force is provide to assist the clutch to be disengaged from the freehub body to reduce the friction. Thus, the bicycle hub could be operated or switched smoothly.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
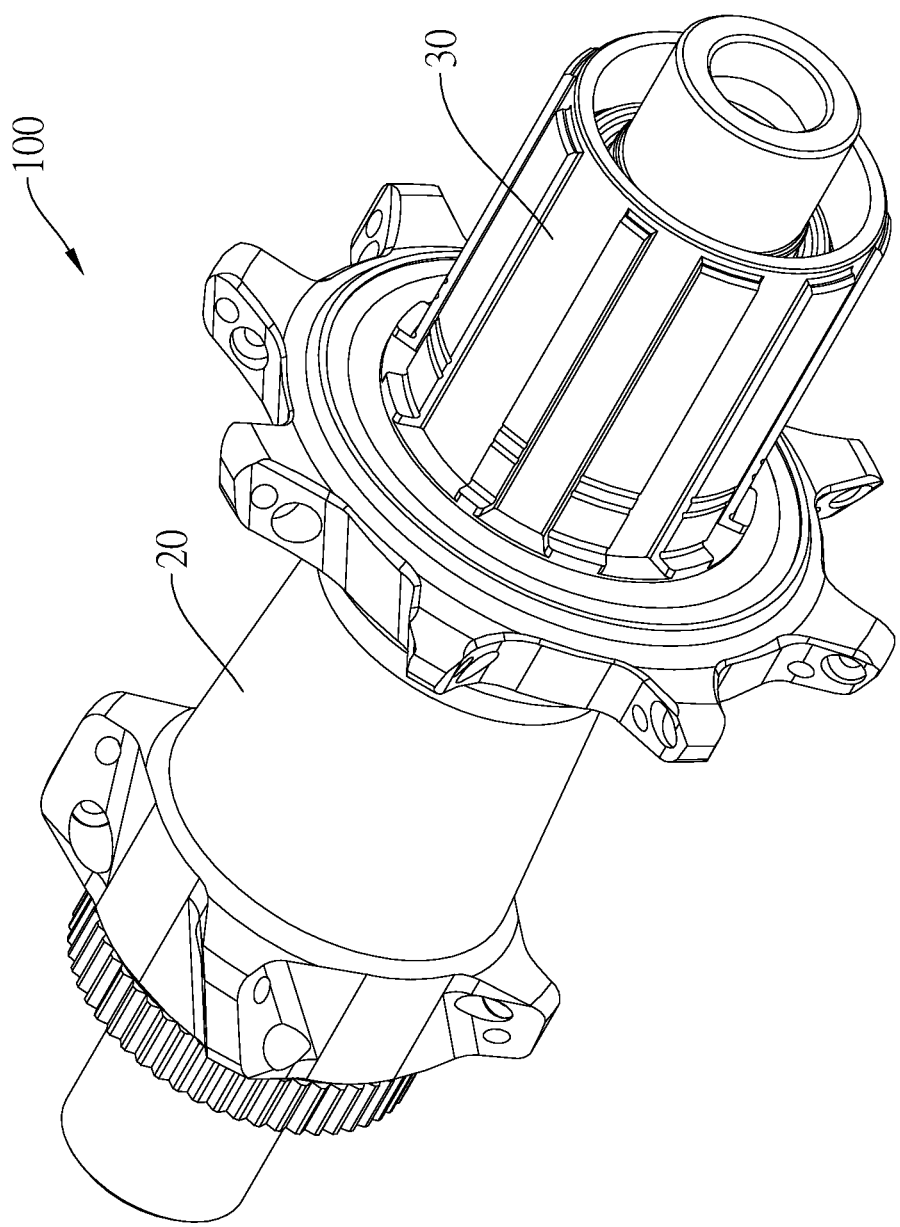
FIG. 1 is a perspective view of the bicycle hub of an embodiment according to the present disclosure.

As illustrated in FIG. 1 to FIG. 5, a bicycle hub 100 of an embodiment according to the present disclosure includes an axle 10, a main body 20, a freehub body 30, and a clutch 40.

Figure 5:
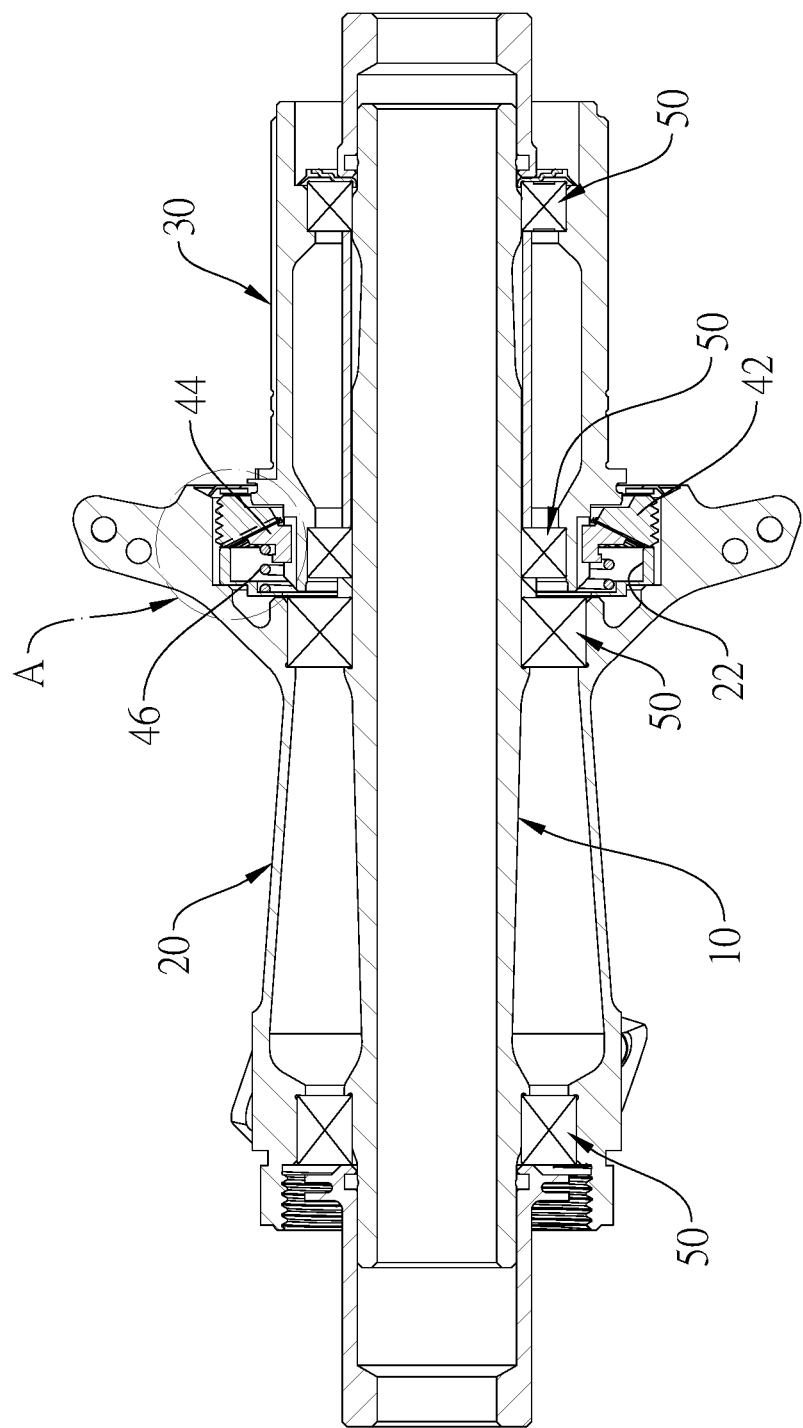
FIG. 5 is a sectional view taken along the 5-5 line in FIG. 4.

The axle 10 of the bicycle hub 100 is engaged with a bicycle frame (not shown) and is an axis of rotation of the bicycle hub 100. The main body 20 is rotatably engaged with the axle 10 and has a plurality of through holes 20a. Two ends of each of a plurality of spokes of a bicycle are respectively connected to one of the plurality of through holes 20a and a rear rim of the bicycle, so that when the main body 20 is rotated, the rear rim of the bicycle could be driven to rotate via the plurality of spokes. The freehub body 30 is also rotatably engaged with the axle 10 and is adapted to be engaged with at least one sprocket of the bicycle. In the current embodiment, a component used for connecting both of the main body 20 and the freehub body 30 to the axle 10 includes a plurality of bearings 50. As illustrated in FIG. 5, the main body 20 is indirectly connected to the axle 10 via two bearings 50, and the freehub body 30 is indirectly connected to the axle 10 via two bearings 50. With such design, the main body 20 and the freehub body 30 could spin relative to the axle 10 along an axis of the axle 10, but the axle 10 does not spin. However, a number of the bearings is not limited to the aforementioned description.

Figure 2:
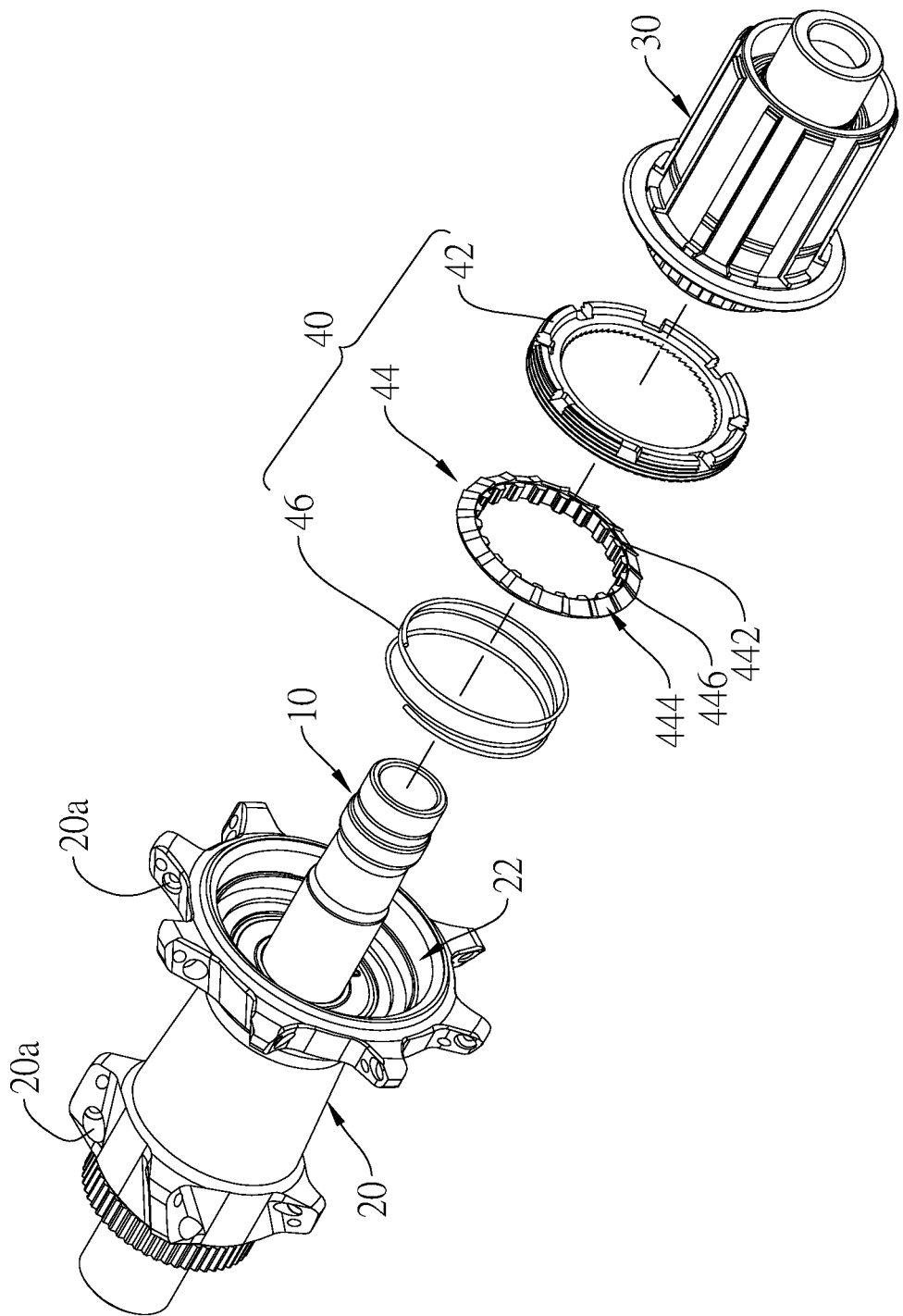
FIG. 2 is a partially exploded view of the bicycle hub of the embodiment.
Figure 3:
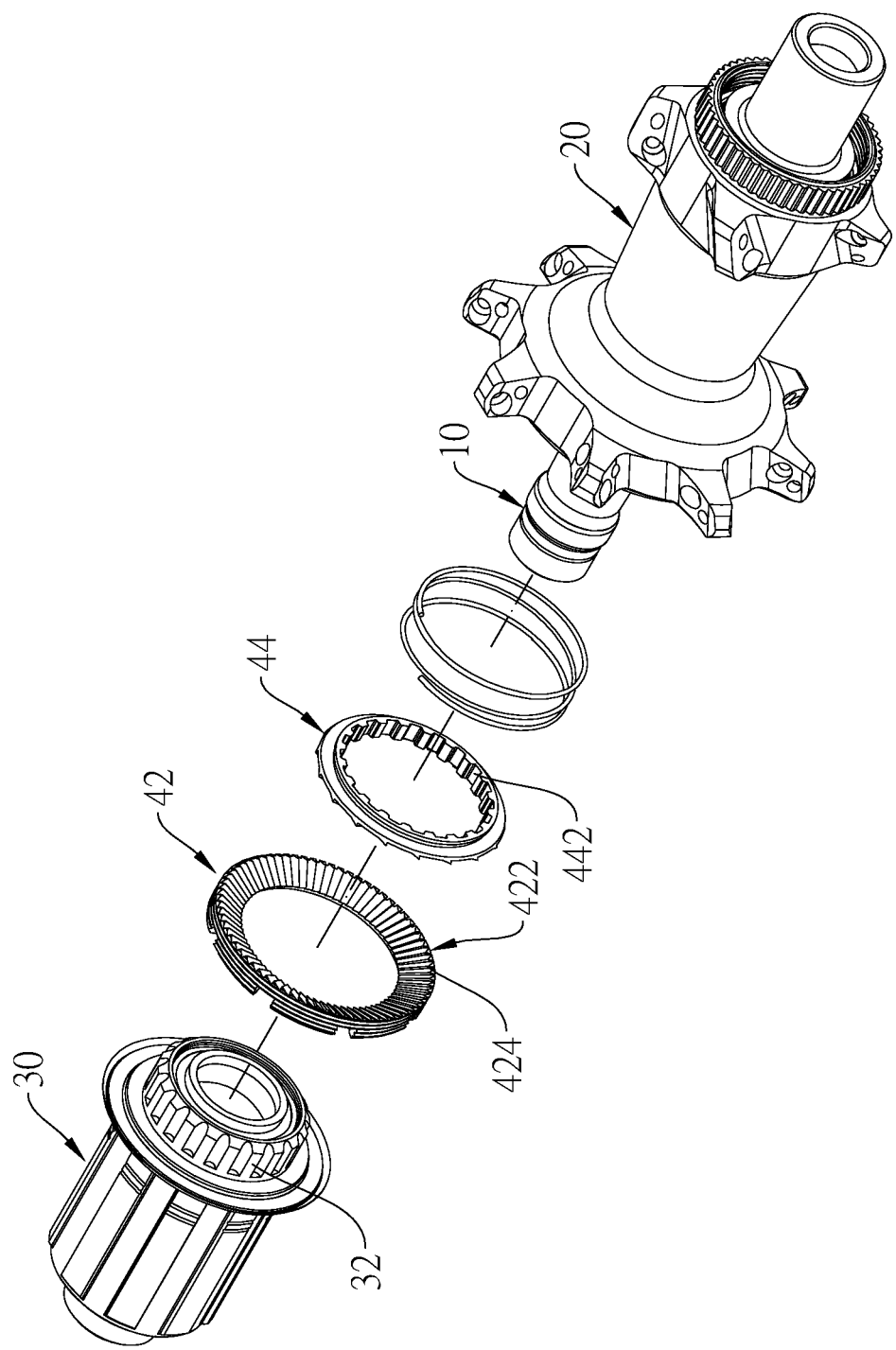
FIG. 3 is a partially exploded view of the bicycle hub of the embodiment, which is seen from another perspective.
Figure 4:
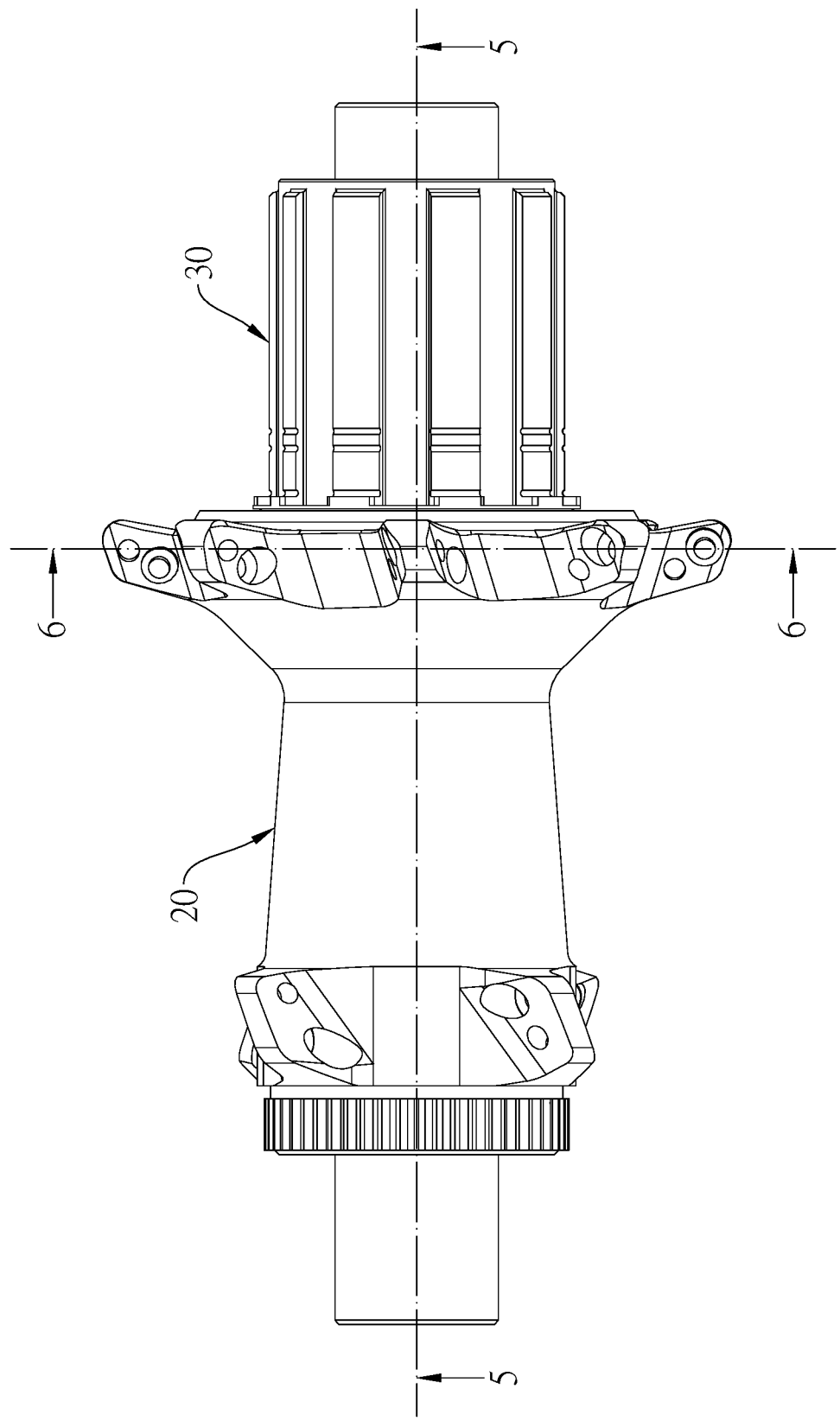
FIG. 4 is a front view of the bicycle hub of the embodiment shown in FIG. 1.

The main body 20 is indirectly connected to the freehub body 30 via the clutch 40. The clutch 40 is disposed in a receiving groove 22 of the main body 20 and includes a first ratchet 42, a second ratchet 44, and a restoring member 46. Either the first ratchet 42 or the second ratchet 44 is disposed with a plurality of second splines 442. One of the first ratchet 42 and the second ratchet 44 is engaged with the main body 20 in a way that the main body 20 could be driven to rotate by the one of the first ratchet 42 and the second ratchet 44, and the other one of the first ratchet 42 and the second ratchet 44 is engaged with the freehub body 30 in a way that the freehub body 30 could drive the other one of the first ratchet 42 and the second ratchet 44 to rotate. In the current embodiment, as illustrated in FIG. 2 and FIG. 3, the first ratchet 42 is engaged with the main body 20 in a way that could drive the main body 20 to rotate. In the current embodiment, the first ratchet 42 is screwed into the main body 20. However, it will be apparent to one skilled in the art that the first ratchet 42 could be secured to the main body 20 by other means, such as a C-shaped ring, and a screw. Additionally, the first ratchet 42 has a first engaging surface 422, wherein the first engaging surface 422 has a plurality of first ratchet teeth 424 which is arranged along the first engaging surface 422.

The second ratchet 44 has a plurality of second splines 442 on an inner periphery of the second ratchet 44. An outer periphery of the freehub body 30 has a plurality of first splines 32. When the second ratchet 44 is engaged with the freehub body 30, each of the plurality of first splines 32 is located between adjacent two of the plurality of second splines 442, so that the plurality of second splines 442 of the second ratchet 44 could slide along the plurality of first splines 32, and the second ratchet 44 could be driven by the freehub body 30 to spin. Each of the second ratchet 44 has a second engaging surface 444 and a plurality of second ratchet teeth 446. A side of the second ratchet 44 abuts against the restoring member 46, and another side of the second ratchet 44 has the second engaging surface 444 facing the first engaging surface 422, wherein the second engaging surface 444 has the plurality of second ratchet teeth 446 which are arranged along the second engaging surface 444. With such design, the second ratchet 44 could be either engaged with or disengaged from the first ratchet 42. A number of the plurality of second ratchet teeth 446 is lesser than a number of the plurality of first ratchet teeth 424, and a distance between the adjacent two of the plurality of second ratchet teeth 446 is not shorter than a distance between adjacent two of the plurality of first ratchet teeth 424, thereby facilitating firm engagement between the first ratchet 42 and the second ratchet 44.

An end of the restoring member 46 abuts against a bottom surface of the receiving groove 22, and another end of the restoring member 46 abuts against the second ratchet 44.

The restoring member 46 exerts a restoring force (not shown) to the second ratchet 44, wherein the restoring force is an axial force in a direction toward the first ratchet 42. In the current embodiment, the restoring member 46 is, but not limited to, a spring. Generally, a component used in the bicycle hub, which is adapted to provide the restoring force, could be a substitute of the spring, such as an elastomer or a magnet.

Reducing a weight of the bicycle is another objective of the present disclosure. Reducing a number of ratchet teeth of the ratchet of the clutch 40 is a mean of reducing weight. As far as an operating process of the clutch 40 is considered, since a torque is exerted to the first ratchet 42 and the second ratchet 44 in the bicycle hub 100 again and again, the first ratchet 42 and the second ratchet 44 are easily broken due to fatigue. Based on the aforementioned description, a performance test is conducted by assuming that the number of the plurality of first ratchet teeth 424 of the first ratchet 42 is multiples of nine, and gradually increase the number of the plurality of first ratchet teeth 424, and increase or decrease the number of the plurality of second ratchet teeth 446 of the second ratchet 44 with each of the number of teeth of the first ratchet 424 for measurement. It has been found that when a central angle between the adjacent two of the plurality of first ratchet teeth 424 is five degrees, namely that the number of the plurality of first ratchet teeth 424 is at least seventy-two, a loud noise generated at a clearance between the first ratchet teeth 424 and the second ratchet teeth 446 due to a great distance between the adjacent two of the first ratchet teeth 424 could be prevented. In the current embodiment, the number of the plurality of first ratchet teeth 424 is further restricted to multiples of eighteen.

Under a condition that a minimum of the number of the plurality of first ratchet teeth 424 is seventy-two, and gradually decrease the number of the plurality of second ratchet teeth 446 of the second ratchet 44 for measurement. It has been found that when the number of the plurality of second ratchet teeth 446 of the second ratchet 44 is at least eighteen, the plurality of first ratchet teeth 424 and the plurality of second ratchet teeth 446 could firmly be engaged with each other, and not only an effect of transmission is great, but also a weight of the second ratchet 44 is reduced.

Besides, without changing the effect of transmission, the number of the plurality of first ratchet teeth 424 of the first ratchet 42 could be increased depending on the required demand, such as nighty, one hundred and twenty-six, or one hundred and forty-four. The second ratchet 44 may increase the number of the plurality of second ratchet teeth 446 according to the number of the plurality of first ratchet teeth 424 of the first ratchet 42, so that avoid a disparity in number between the first ratchet teeth 424 and the second ratchet teeth 446, leading to a bad engagement between the first ratchet 42 and the second ratchet 44. A ratio of the number of the plurality of first ratchet teeth 424 to the number of the plurality of second ratchet teeth 446 includes but not limited to 90:18, 90:45, 126:18, 144:18, 144:36, and 144:72. Comparing to a conventional clutch structure, the clutch 40 in the present disclosure could achieve the objective of reducing weight.

Moreover, in the process of increasing the number of the plurality of first ratchet teeth 424 of the first ratchet 42, it has been found that a maximum of the number of the plurality of first ratchet teeth 424 is one hundred and eighty, in order to avoid the plurality of first ratchet teeth 424 is too small in size to affect the engagement between the first ratchet 42 and the second ratchet 44.

In this experiment, a conclusion is obtained that the ratio of the number of the plurality of first ratchet teeth 424 to the number of the plurality of second ratchet teeth 446 is preferably two, three, five, seven, or the multiples thereof. Furthermore, when the number of the plurality of first ratchet teeth 424 of the first ratchet 42 is multiples of the number of the plurality of second ratchet teeth 446 of the second ratchet 44, the second ratchet teeth 446 are evenly engaged with the first ratchet teeth 424, so that transmission of force is more even, thereby avoiding a stress is concentratedly applied to a part, leading to accelerated fatigue. In the current embodiment, the ratio of the number of the plurality of first ratchet teeth 424 to the number of the plurality of second ratchet teeth 446 is 72:18, namely four.

Figure 6:
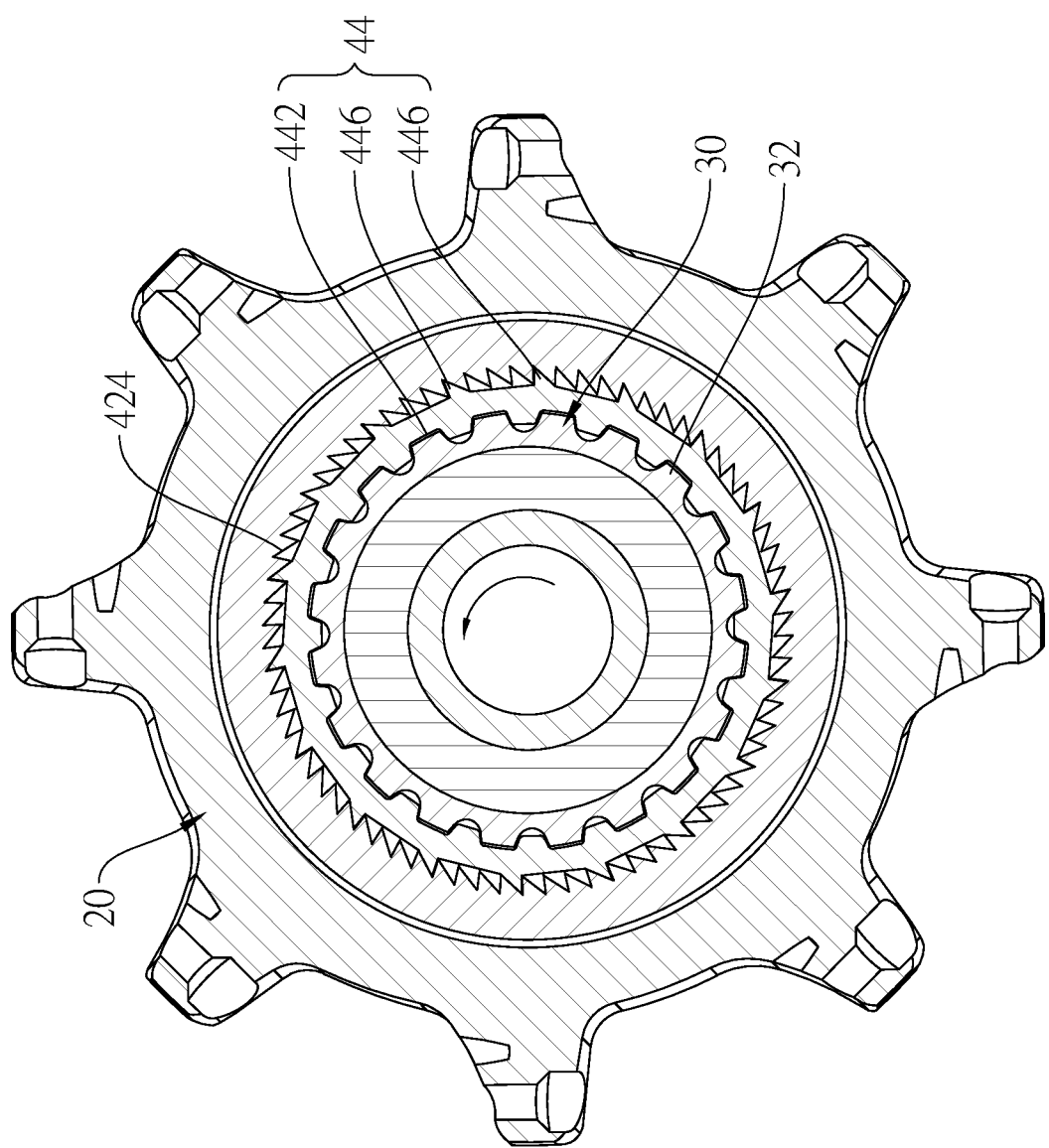
FIG. 6 is a sectional view taken along the 6-6 line in FIG. 4.
Figure 7:
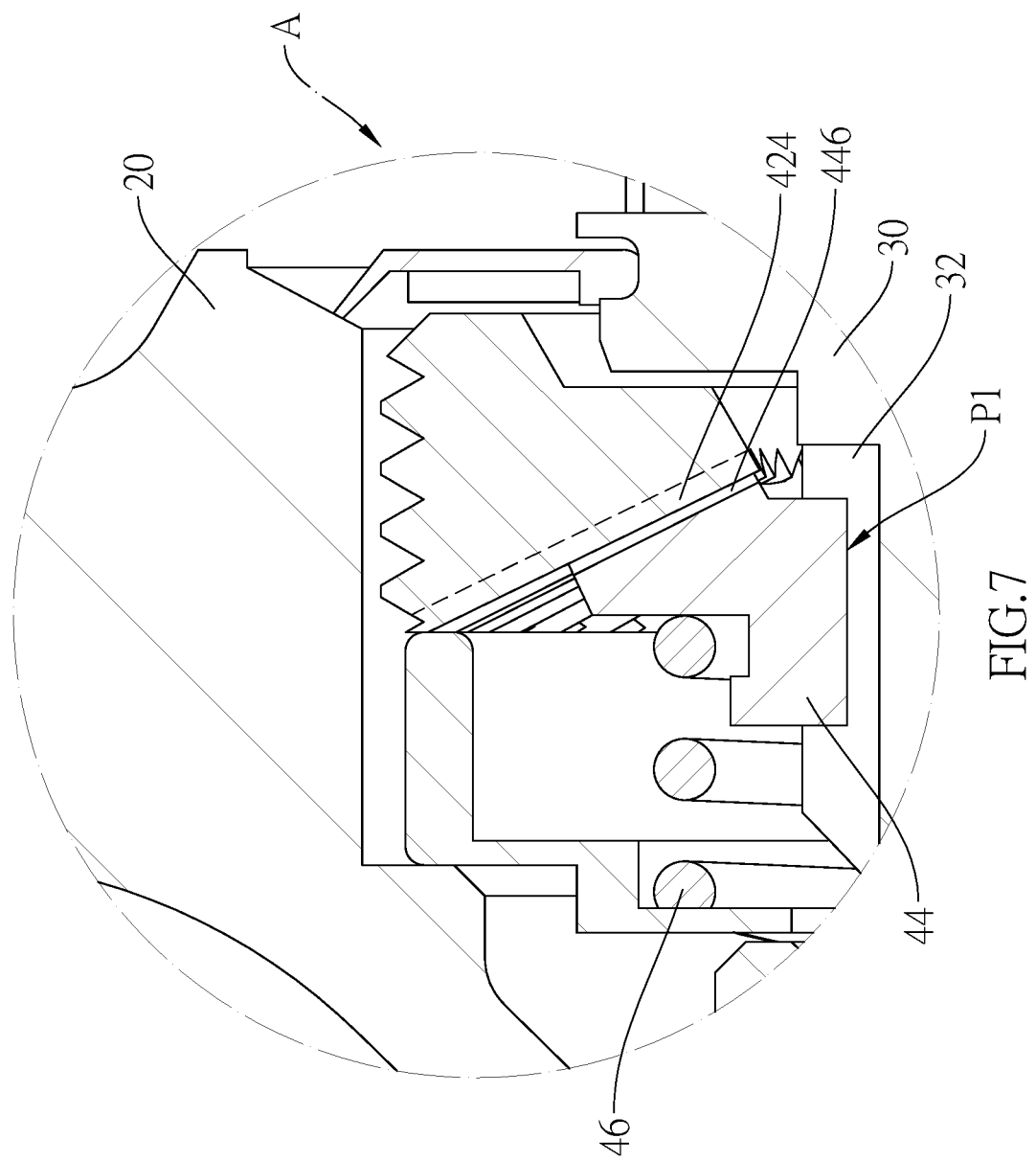
FIG. 7 is an enlarged partial view of a marked region A in FIG. 5.
Figure 8:
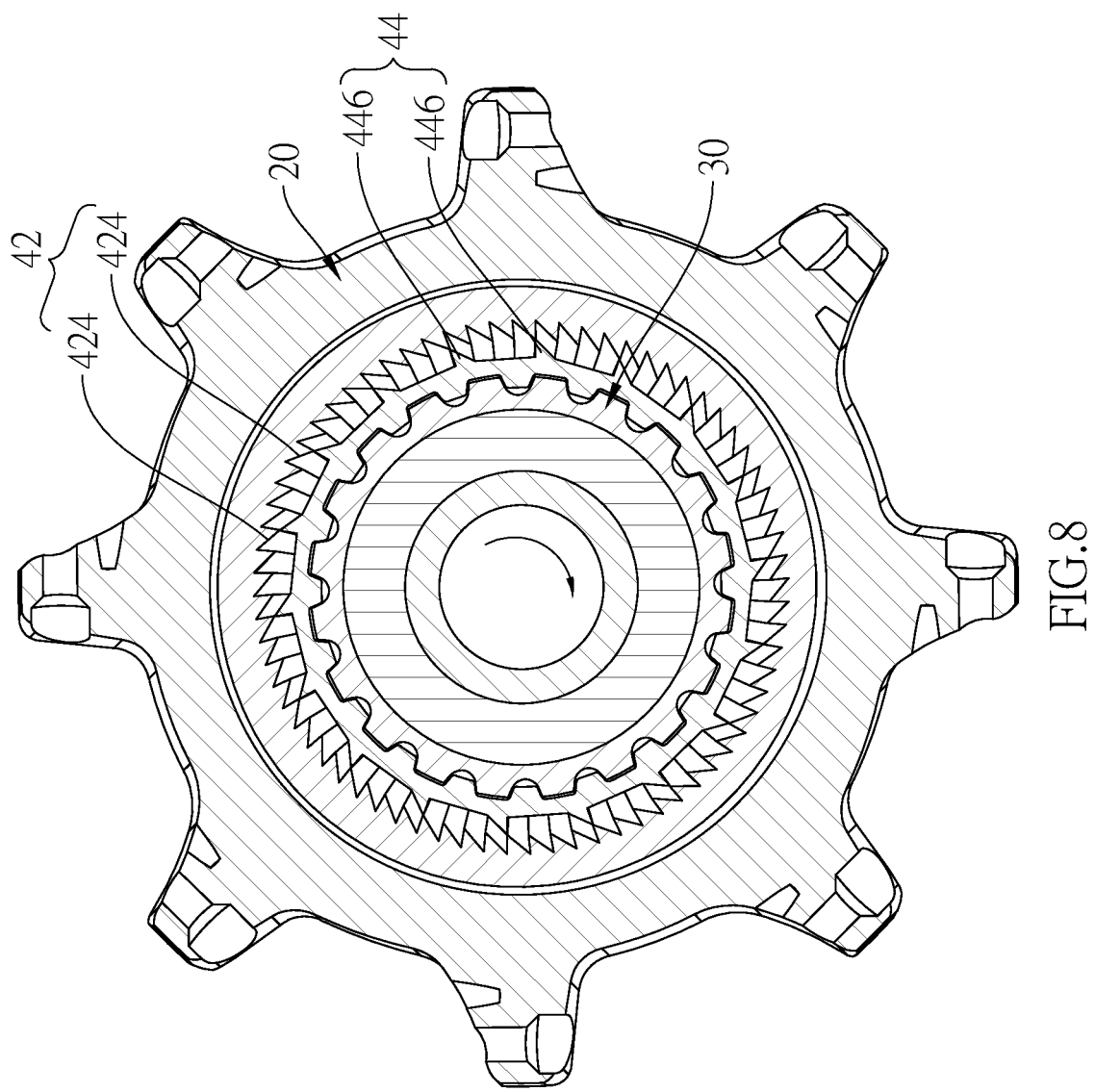
FIG. 8 is similar to FIG. 6, showing the first ratchet is disengaged from the second ratchet.
Figure 9:
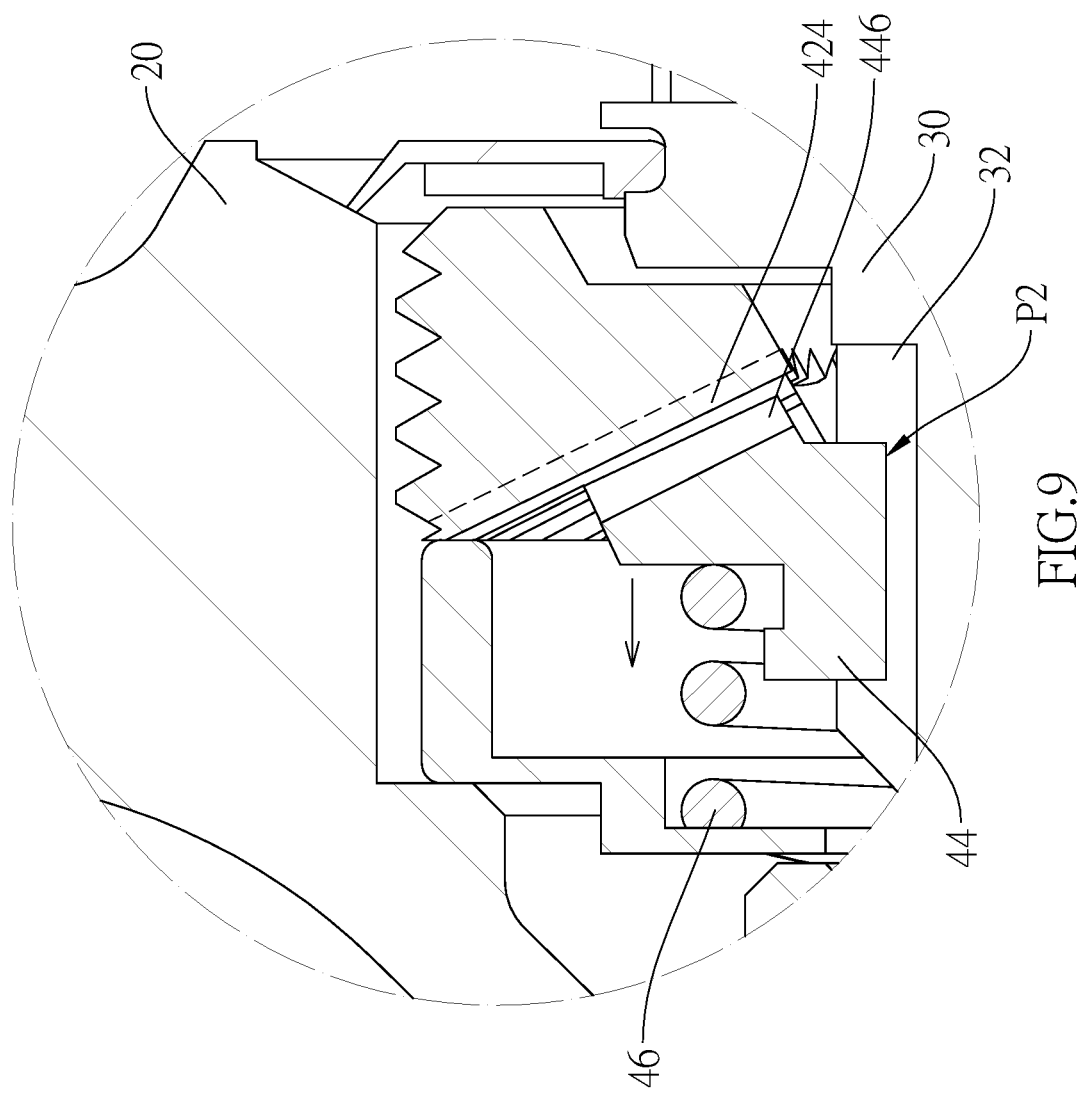
FIG. 9 is similar to FIG. 7, showing the first ratchet is disengaged from the second ratchet and the spring is compressed.

As illustrated in FIG. 6 to FIG. 9, the second ratchet 44 is driven to move by engaging and disengaging between the plurality of first ratchet teeth 424 and the plurality of second ratchet teeth 446 and is movable along an axial direction of the axle 10 between a first position P1 and a second position P2. As illustrated in FIG. 6 and FIG. 7, when the at least one sprocket is driven by pedaling to drive the freehub body 30 to rotate counter-clockwise, and the second ratchet 44 is located at the first position P1, and the second ratchet 44 is engaged with the first ratchet 42, the freehub body 30 drives the main body 20 to rotate simultaneously via the second ratchet 44 and the first ratchet 42, thereby driving wheels of the bicycle to rotate. As illustrated in FIG. 8 and FIG. 9, when the freehub body 30 is rotated clockwise by applying an external force, the plurality of second ratchet teeth 446 of the second ratchet 44 slides through surfaces of the plurality of first ratchet teeth 424, so that the second ratchet 44 is moved to the second position P2 from the first position P1, and the second ratchet 44 is disengaged from the first ratchet 42, thereby compressing the restoring member 46. In this way, the freehub body 30 spins relative to the main body 20 without transmit a torque to the main body 20. At the same time, the restoring force could push the second ratchet 44 back to the first position P1 from the second position P2, so that the second ratchet 44 could be engaged with the first ratchet 42 again.

Figure 10:
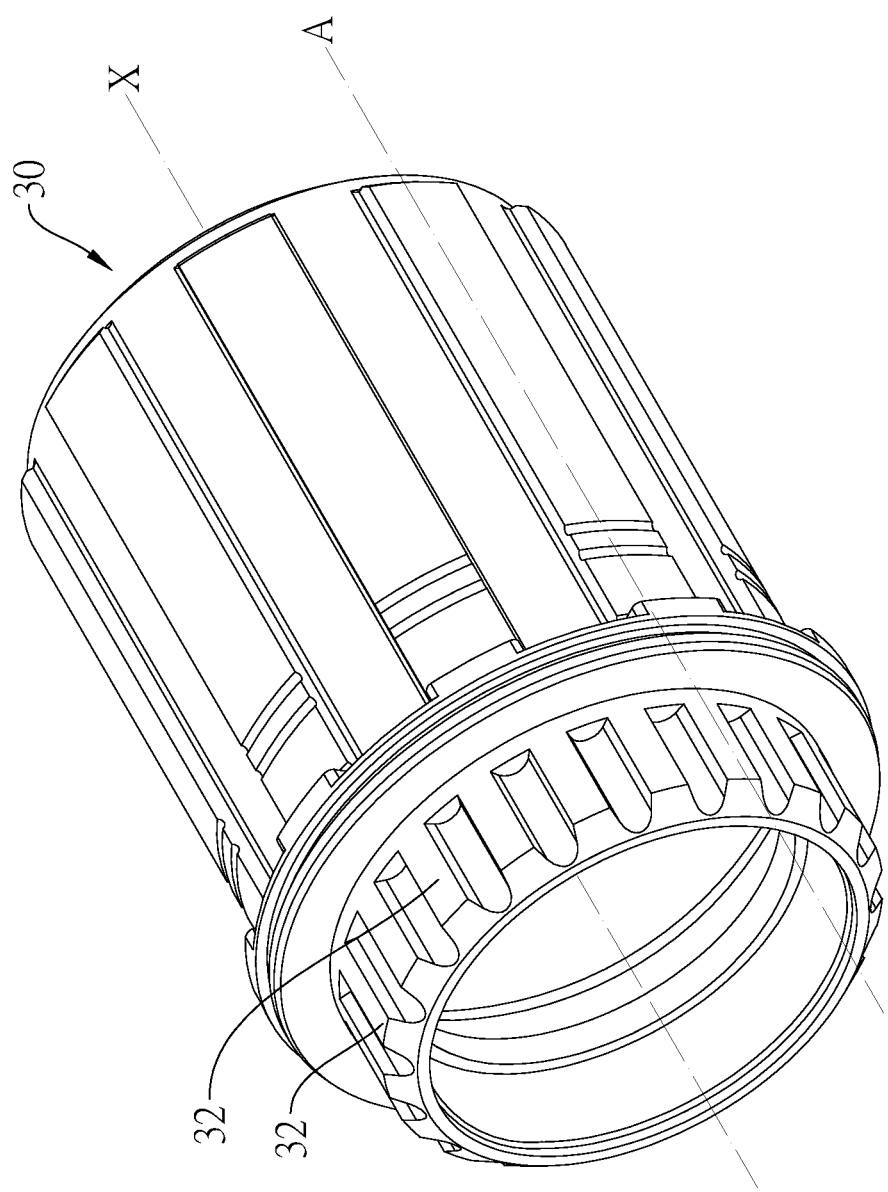
FIG. 10 is a perspective view of the freehub body of the bicycle hub of the embodiment.
Figure 11:
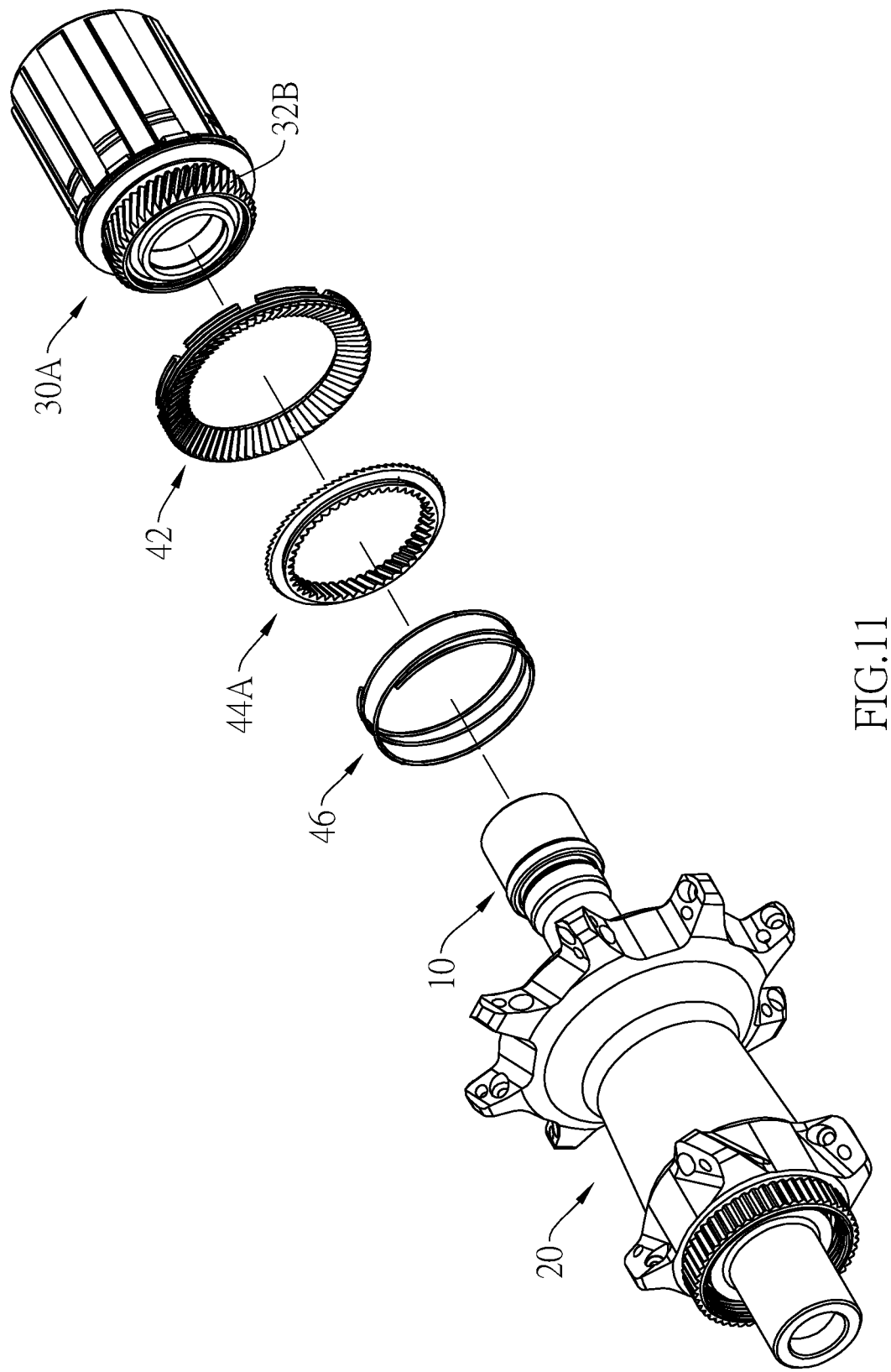
FIG. 11 is an exploded view of the freehub body of the bicycle hub of another embodiment according to the present disclosure.
Figure 12:
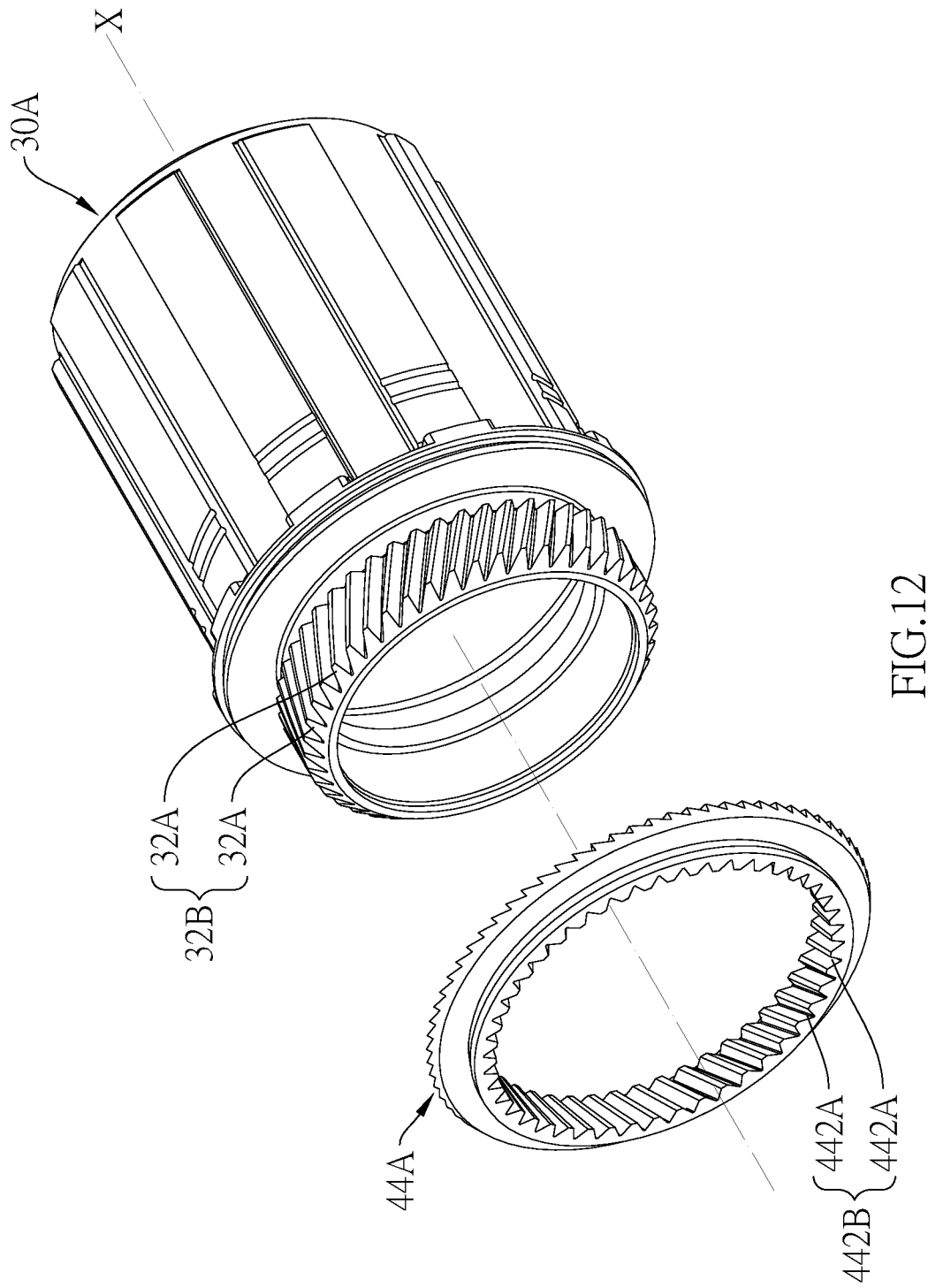
FIG. 12 is a perspective view of the freehub body of the bicycle hub of the another embodiment, showing the second ratchet is departed from the freehub body.
Figure 13:
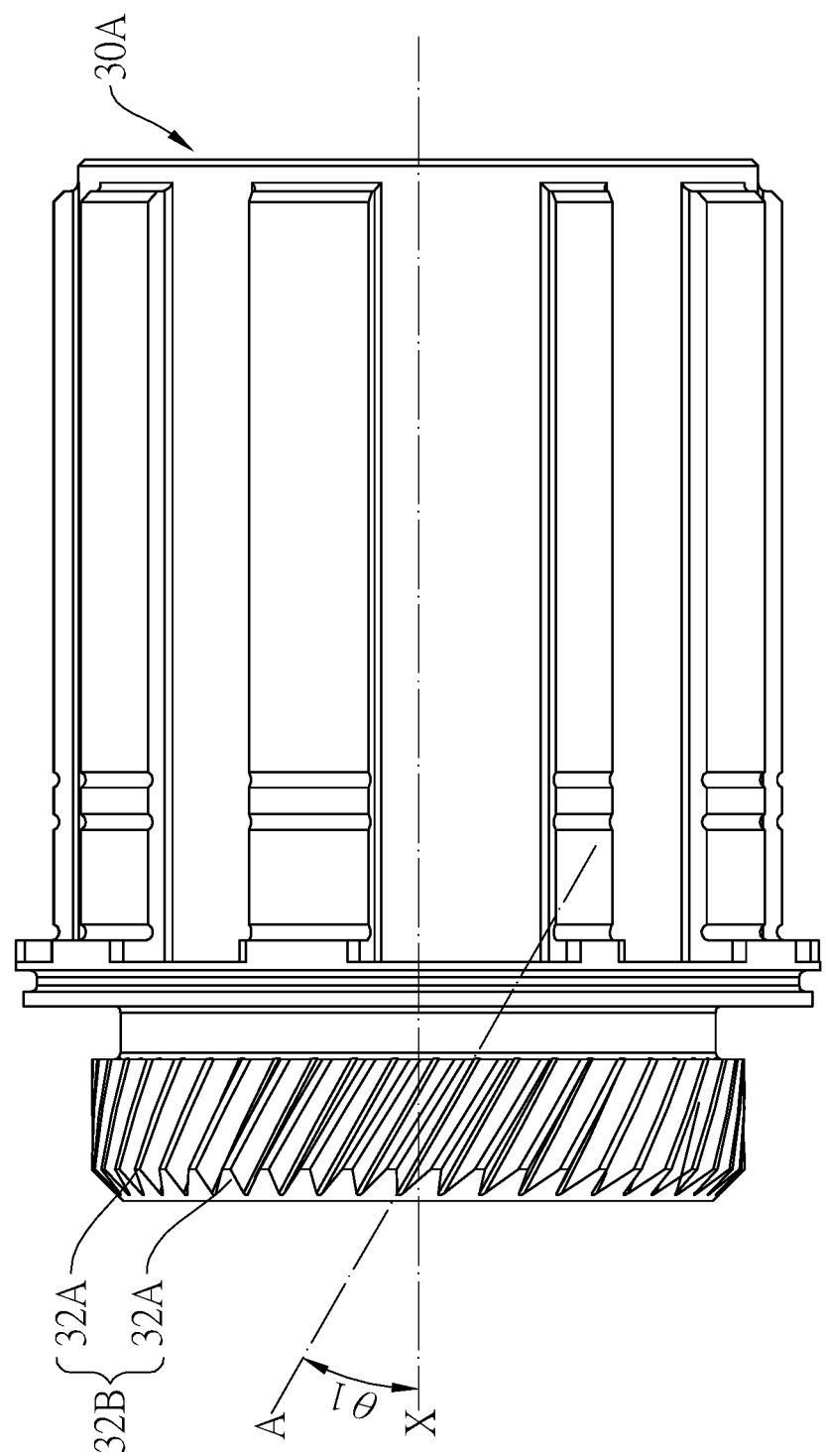
FIG. 13 is a right side view of the freehub body of the another embodiment shown in FIG. 12.
Figure 14:
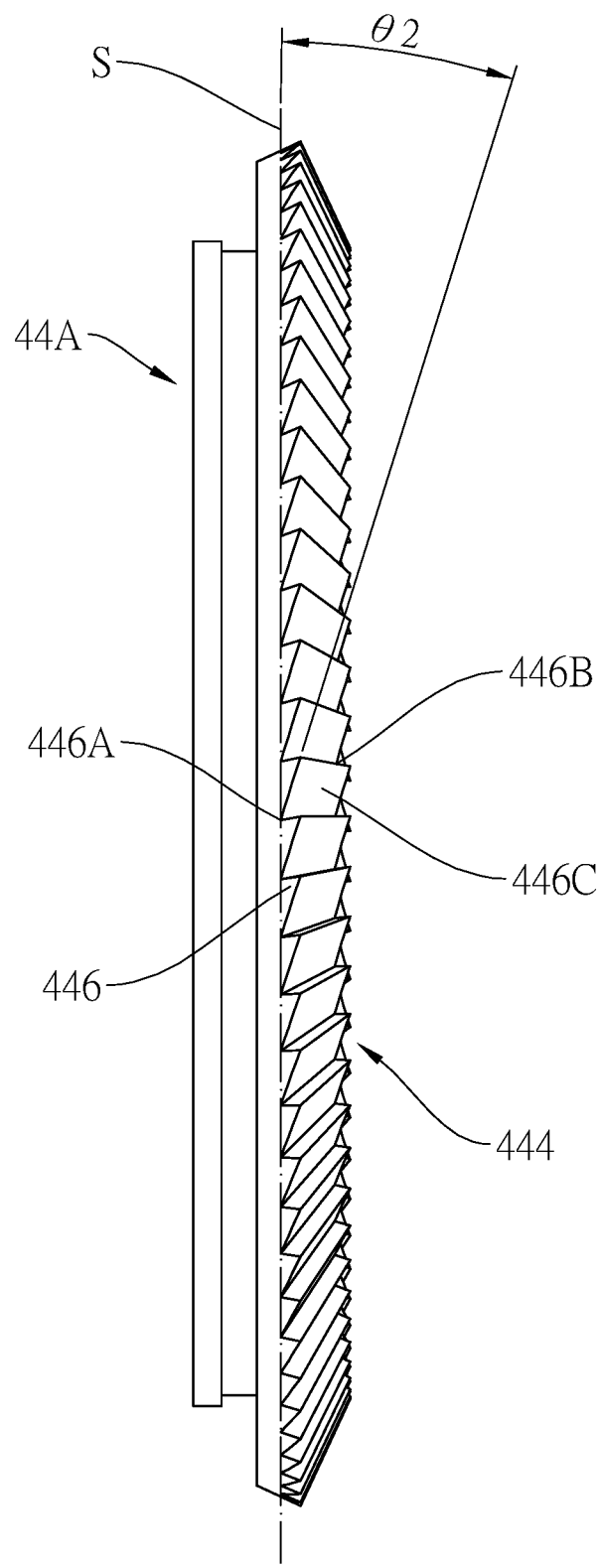
FIG. 14 is a right side view of the second ratchet shown in FIG. 12.
Figure 15:
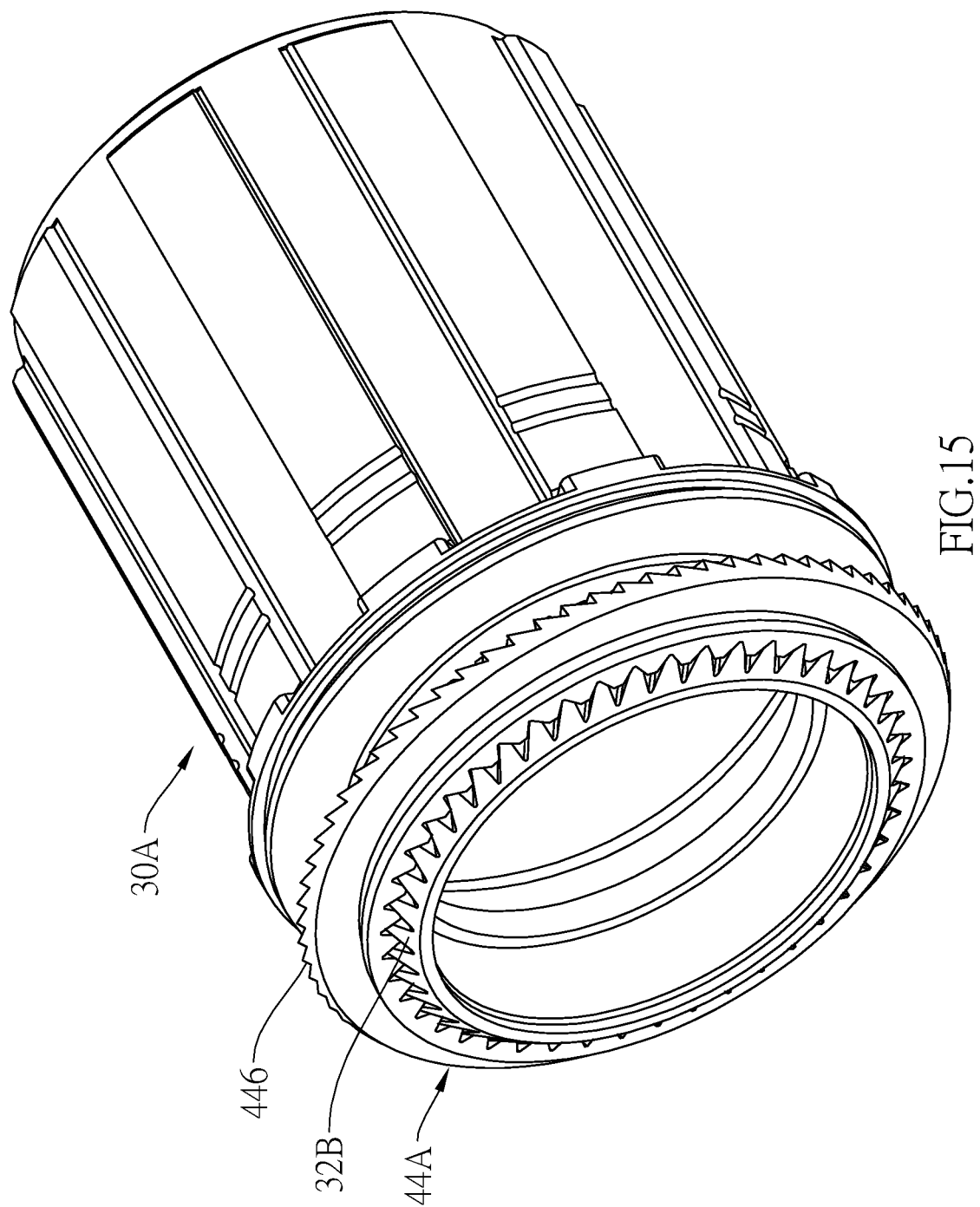
FIG. 15 is a perspective view of the freehub body of the bicycle hub of the another embodiment, showing the second ratchet is engaged with the freehub body.

Additionally, except the plurality of first splines 32 of the freehub body 30 is formed by protruding and extending in a longitudinal direction A which is parallel to an axial direction X of the freehub body 30 as shown in FIG. 10, a freehub body 30A and a second ratchet 44A of another embodiment according to the present disclosure are shown in FIG. 11 to FIG. 13, a longitudinal direction A of a plurality of first splines 32A obliquely intersects with an axial direction X of the freehub body 30A to form a helical angle θ1 between the longitudinal direction A and the axial direction X, wherein the plurality of first splines 32A constitutes a helical portion 32B whose helical direction is the same as a counter-clockwise rotational direction of the freehub body 30A. The helical angle θ1 is ranged between 15 to 40 degrees. After the freehub bud 30A is disposed to an axle of a bicycle hub, the axial direction X of the freehub body 30A is completely overlapped with an axial direction of the axle. The second splines 442A of the second ratchet 44A correspond to the helical portion 32B of the freehub bud 30A, and the second ratchet 44A has a helical portion 442B corresponding to the helical portion 32B, wherein a plurality of gaps between a thread of the helical portion 442B constitutes a plurality of second splines 442A. More specifically, as illustrated in FIG. 14 and FIG. 15, the second ratchet 44A has the second engaging surface 444 that is disposed with the plurality of second ratchet teeth 446, and each of the second ratchet teeth 446 has an inclined plane 446C, a tooth bottom 446A, and a tooth top 446B, and each of the second ratchet teeth 446 tilts from the tooth bottoms 446A to the tooth tops 446B along an inclined plane. An imaginary plane S is defined to be perpendicular to the axis of rotation and passes through the second ratchet 44, wherein the tooth bottom 446A of each of the second ratchet teeth 446 of the second engaging surface 444 intersects with the imaginary plane S to form a slip angle θ2 between the imaginary plane S and the inclined plane 446C of one of the second ratchet teeth 446. The slip angle θ2 is ranged between 15 and 20 degrees. The helical angle θ1 is greater than the slip angle θ2, and the helical angle θ1 divided by the slip angle θ2 is greater than 1.1 and is smaller than 2. In the current embodiment, the helical angle θ1 is 27 degrees, the slip angle θ2 is 17.34 degrees. However, the angle is not limited to the above mentioned.

With such design, when the at least one sprocket of the bicycle is driven by pedaling to drive the freehub body 30A to spin counter-clockwise, a plurality of second ratchet teeth of the second ratchet 44A is affected by the load exerted by a plurality of first ratchet teeth of a first ratchet (not shown), so that the plurality of second splines 442A is moved along the longitudinal direction A of the plurality of first splines 32A toward the first ratchet 42, thereby enhancing an engagement between the second ratchet 44A and the first ratchet 42. On contrary, when the freehub body 30A spins clockwise by exerting an external force, the plurality of second splines 442A of the second ratchet 44A is moved away from the first ratchet along the longitudinal direction A of the plurality of first splines 32A, which is beneficial for disengagement between the second ratchet 44A and the first ratchet 42.

Additionally, since each of the first splines 32A and each of the second ratchet teeth 446 are obliquely arranged to have the helical angle θ1 and the slip angle θ2, respectively, when a rider pedals the bicycle to rotate the freehub body 30, a normal force could provide between the first splines 32A of the freehub body 30A and the second splines 442A of the clutch 40 to guide the freehub body 30A to be engaged with the clutch 40, thereby enhancing the engagement between the second ratchet 44 and the first ratchet 42. Besides, when the rider stop pedaling the bicycle and slide, the helical angle θ1 and the slip angle θ2 could reduce the friction between the second ratchet 44A and the freehub body 30, thereby allowing the second ratchet 44A to be easily departed from the first ratchet 42. Especially, when the helical angle θ1 is greater than the slip angle θ2, and the helical angle θ1 divided by the slip angle θ2 is greater than 1.1 and is smaller than 2, the clutch 40 could operate smoothly.

In other embodiments, the main body could be driven by the second ratchet and the freehub body could be driven by the first ratchet, wherein transmission could be achieved by engaging the second ratchet and the first ratchet. Besides, optionally, the restoring member is connected to the first ratchet, so that the first ratchet could move along the axial direction of the axle, thereby achieving the engagement and the disengagement between the first ratchet and the second ratchet.

To sum up, a design about the number of the plurality of first ratchet teeth of the first ratchet and the number of the plurality of second ratchet teeth of the second ratchet according to the present disclosure could make the total weight of the clutch of the present disclosure lighter than a conventional clutch whose the ratchets are fully engaged with each other. Additionally, with such design about a ratio of the number of the plurality of first ratchet teeth to the number of the plurality of second ratchet teeth, the contact surface between the first ratchet and the second ratchet could make the first ratchet firmly be engaged with the second ratchet, so that the freehub body could stably drive the main body to move simultaneously. Besides, the design about the ratio could prevent from generating the loud noise during riding a bicycle with the conventional clutch, causing a bad feel to a rider, because a ratio of a number of first ratchet teeth to a number of second ratchet teeth of the conventional clutch is too great.

Besides, since the first splines 32A is designed to have the helical angle θ1 and the second splines 442A is designed to have a slip angle θ2, when the freehub body 30 is driven to rotate, the first splines 32A provides the normal force to the second splines 442A to drives the second ratchet 44A to be engaged with the first ratchet 42. When the freehub body 30 does not rotate, the helical angle θ1 and the slip angle θ2 could help reducing the friction between the second ratchet 44A and the freehub body 30, thereby allowing the second ratchet 44A to be disengaged from the first ratchet 42 smoothly.

It must be pointed out that the embodiment described above is only a preferred embodiment of the present disclosure. All equivalent structures which employ the concepts disclosed in this specification and the appended claims should fall within the scope of the present disclosure.

What is claimed is:

1. A bicycle hub comprising:
an axle adapted to be an axis of rotation of the bicycle hub;
a main body rotatably engaged with the axle;
a freehub body rotatably engaged with the axle and adapted to be engaged with a sprocket, wherein the freehub body is disposed with a plurality of first splines; each of the plurality of first splines is defined to have a longitudinal direction; the longitudinal direction of each of the plurality of first splines obliquely intersects with an axial direction of the axle; and
a clutch comprising a first ratchet and a second ratchet, wherein either the first ratchet or the second ratchet is disposed with a plurality of second splines, wherein the plurality of second splines is engaged with the plurality of first splines in a way that each of the plurality of second splines is slidable along the longitudinal direction of one of the plurality of first splines;
wherein the second ratchet has a plurality of second ratchet teeth;
wherein the first ratchet has a first engaging surface, wherein the first engaging surface of the first ratchet has a plurality of first ratchet teeth;
wherein one of the first ratchet and the second ratchet is engaged with the main body in a way that is able to drive the main body to rotate, and the other one of the first ratchet or the second ratchet is engaged with the freehub body in a way that is able to drive the freehub body to rotate; the other one of the first ratchet or the second ratchet is able to be driven to move by engaging and disengaging between the plurality of first ratchet teeth and the plurality of second ratchet teeth, and the first ratchet or the second ratchet is movable along the axial direction of the axle between a first position and a second position, wherein the first position is a position that the first ratchet is engaged with the second ratchet, and the second position is a position that the first ratchet is disengaged from the second ratchet; and
wherein the longitudinal direction of each of the plurality of first splines obliquely intersects with the axial direction of the freehub body to form a helical angle between the longitudinal direction and the axial direction; the second ratchet has a second engaging surface; each of the plurality of second ratchet teeth has a tooth bottom and a tooth top, wherein each of the plurality of second ratchet teeth tilts from the tooth bottom to the tooth top to form an inclined plane; an imaginary plane is defined to be perpendicular to the axis of rotation and passes through the plurality of second ratchet teeth of the second ratchet; the inclined plane of each of the plurality of second ratchet teeth intersects the imaginary plane to form a slip angle therebetween; the helical angle is greater than or equal to the slip angle.

2. The bicycle hub of claim 1, wherein the helical angle divided by the slip angle is greater than 1.1 and is smaller than 2.

3. The bicycle hub of claim 1, wherein the helical angle is arranged between 15 and 40 degrees; the slip angle is arranged between 15 and 20 degrees.

4. The bicycle hub of claim 1, wherein the plurality of first ratchet teeth which is arranged along the first engaging surface; the second engaging surface of the second ratchet corresponds to the first engaging surface, wherein the plurality of second ratchet teeth is arranged along the second engaging surface; the number of second ratchet teeth is smaller than the number of first ratchet teeth, and a maximum number of first ratchet teeth is 180; the second ratchet is disposed with the plurality of second spline.

5. The bicycle hub of claim 4, wherein a distance between adjacent two of the second ratchet teeth of the second ratchet is not shorter than a distance between adjacent two of the plurality of first ratchet teeth of the first ratchet.

6. The bicycle hub of claim 1, wherein the second ratchet is movable along an axial direction of the axle between the first position and the second position; the clutch comprises a restoring member; the restoring member is connected to the second ratchet for exerting a restoring force to the second ratchet to keep the second ratchet at the first position.

7. The bicycle hub of claim 6, wherein the restoring member is a spring, an elastomer, or a magnet.

\* \* \* \* \*